March 6, 1934.    H. J. WALKER    1,949,984
PIPE LINING
Filed June 3, 1932
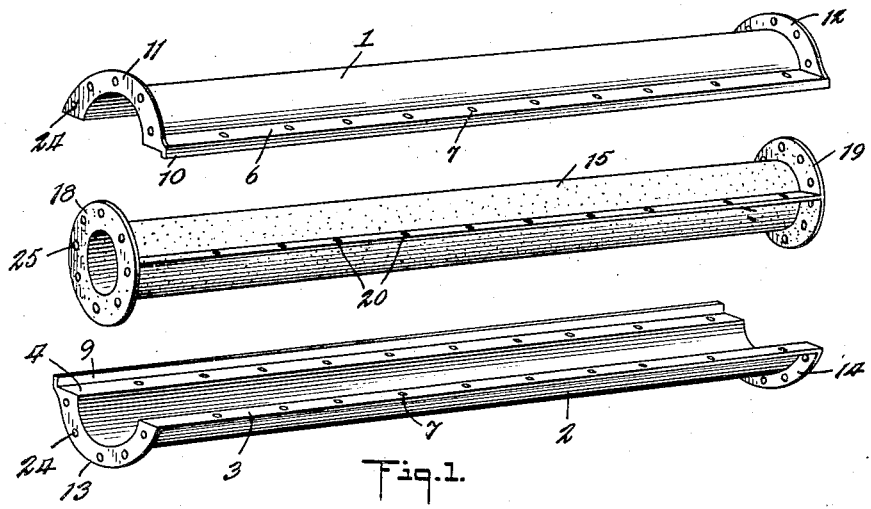
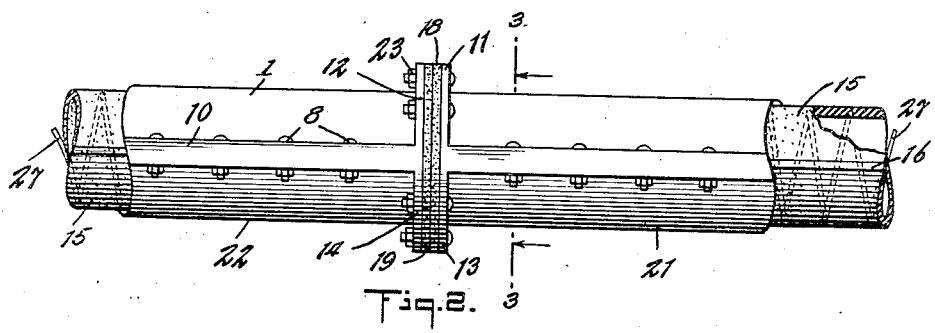
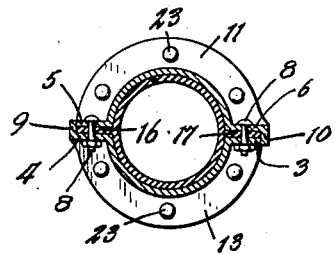
INVENTOR
Herbert J. Walker
BY
ATTORNEYS Patented Mar. 6, 1934

1,949,984

UNITED STATES PATENT OFFICE 1,949,984

PIPE LINING

Herbert J. Walker, Brooklyn, N. Y.

Application June 3, 1932, Serial No. 615,156

3 Claims. (Cl. 137—75)

This invention relates to certain improvements in pipe constructions.

In pipe constructions in which pressure or suction is used for delivering abrasive substances, such as sand, ashes, and the like, chemicals and other liquids or solids which tend to injure or destroy the pipe structure, the pipe sections are made of metal and the action of the substances delivered through the pipe tends to wear out the pipe so that it has to be frequently renewed, and where chemicals, as acids, are delivered there is a reaction tending to break down or destroy the pipe. It has been proposed to line pipes with material, such as rubber or the like, to prevent wear on the pipe, and in certain constructions this lining material has been cemented or otherwise permanently secured in the pipe sections. This construction has its disadvantage, in that the lining is not removable. It has also been proposed to line pipes with rubber or like material which is removable. However, in such constructions, the action of the sand or the like passing through the pipe causes the lining to creep and thus restrict or obstruct the delivery ends of the pipe sections.

It is the especial object of the present invention to provide a pipe construction comprising a multi-part pipe section and a removable lining therefor of a resilient material, such as rubber or rubber like composition, which is provided with means by which it can be locked in position in a pipe section so as to be removable for replacement, and so that it is prevented from creeping and thus obstructing the delivery end of the pipe section with which it is used.

A further object of the invention is to provide a removable lining of the character referred to which is provided with both side flanges and end flanges so that it can be readily and easily locked in position in the pipe, and several pipe sections coupled together where desired.

With these and other objects not specifically referred to in view, the invention consists in certain novel parts, arrangements and combinations which will be described in connection with the accompanying drawing and the novel features pointed out in the claims hereunto annexed.

In the drawing,—

Figure 1 is a perspective view showing two pipe sections and the improved lining;

Figure 2 is a side view, partly broken away, of two adjacent pipe sections showing the method of holding the linings in place, and Figure 3 is a sectional view taken on the line 3—3 of Figure 2.

Referring now to the drawing, the construction selected to illustrate the invention is a cylindrical pipe which is made in two sections and a cylindrical lining which preferably is made of rubber, although other resilient or rubber like material may be used. As illustrated, each pipe is made in two sections 1, 2, which are provided with side flanges 3, 4, 5, 6, these side flanges being provided with a desired number of holes 7 to receive locking bolts 8. The flange construction of these pipe sections may be somewhat varied, but, as shown, the flange 4 of the lower section 2 is provided with an upturned edge 9 and the opposite flange 6 of the upper pipe section 1 is provided with a downwardly extending edge 10, so that these parts cooperate to hold the sections in rigid relation when locked together by the bolts 8.

The pipe sections are also provided with end flanges 11, 12, 13, 14 by which two adjacent pipe sections may be coupled together. These pipe sections are made of metal, such as cast iron or steel, and in accordance with the invention an improved lining is provided to prevent the wear of these sections by abrasive substances being passed through this improved lining; also, in accordance with the invention, this lining is removable so that when worn out it can readily be taken from the pipe sections and a new one inserted, and this lining is arranged to be locked in the sections so that there will be no creeping action. The particular material of the lining, of course, may be widely varied, but preferably it will be a resilient one, such as rubber or rubber composition, the particular lining shown being a rubber one.

This lining 15 is an integral structure and is formed with side flanges 16, 17 and preferably with integral end flanges 18, 19. The side flanges are provided with holes or apertures 20 corresponding to the apertures 7 in the pipe sections. In assembling the construction, the lining is simply laid in the pipe section 2, the pipe section 1 then being placed over the lining with the holes 7, 20 in the pipe sections in alignment and then the parts are bolted together by the bolts 8, it being understood that the lining is substantially the diameter of the pipe sections when these are assembled, so that the lining is snugly held in place.

Two pipe lengths, such as indicated at 21, 22, may be coupled together, as indicated in Figure 2, by means of bolts 23 passing through holes 24 in the pipe sections and holes 25 in the flanges 18, 19 of the lining member, this construction providing a tight and effective joint, though, of course, it will be understood that other forms for connecting two adjacent pipe lengths may be used if desired.

Under some circumstances, especially where the pipe is to be used under suction conditions, the lining may be strengthened by wire or other suitable material, such as the wire helix 27 shown in dotted lines in Figure 2, this preventing the collapsing or deforming of the lining under suction. This wire may be held in position either by embedding it in the rubber or by wrapping it around the rubber lining.

With the construction shown and described, a very efficient lining has been provided for metal pipes which are to be used for conducting abrasive substances, a lining which can readily be removed for replacement, which can easily and quickly be placed in position, and which is so locked in place that it cannot creep and thus restrict or obstruct the delivery end of the pipe sections with which it is used. Furthermore, by preventing the lining from creeping, the life of the lining is prolonged and a more durable structure is produced.

While the invention has been shown and described in its preferred form, it will be understood that various changes may be made in the specific construction of the lining and in the method of holding it in the shell and that such changes may be made without departing from the invention as defined in the appended claims.

What is claimed is:

1. A pipe construction comprising metallic shell sections provided with side flanges and end flanges and a removable lining of resilient material having end flanges and side flanges cooperating with the flanges of the shell sections, and means for locking the lining in position.

2. A pipe construction comprising parallel metallic shell sections having side flanges, and a removable lining of rubber material coextensive with the pipe sections and having flanges locked in place between the side flanges of the shell at a plurality of points between its ends.

3. A pipe construction comprising metallic shell sections provided with side flange and end flanges, a removable lining of resilient material coextensive with the shell sections and having end flanges secured to the end flanges of the shell sections, and side flanges locked in place between the side flanges of the shell sections at a plurality of points between the ends of the lining.

HERBERT J. WALKER.